US012800756B2

(12) United States Patent
Louis et al.

(10) Patent No.: US 12,800,756 B2
(45) Date of Patent: Nov. 17, 2026

(54) RADAR SYSTEM WITH SPLIT RECEIVE PHASED ARRAY ANTENNA

(71) Applicant: MatrixSpace, Inc., Burlington, MA (US)

(72) Inventors: Edward Vincent Louis, Campton Hills, IL (US); Benjamin O. White, Crystal Lake, IL (US); Bryan J. Fox, Evanston, IL (US)

(73) Assignee: MatrixSpace, Inc., Burlington, MA (US)

( * ) Notice: Subject to any disclaimer, the term of this patent is extended or adjusted under 35 U.S.C. 154(b) by 124 days.

(21) Appl. No.: 19/062,355

(22) Filed: Feb. 25, 2025

(65) Prior Publication Data

US 2026/0251783 A1 Aug. 27, 2026

(51) Int. Cl.

*G01S 13/90* (2006.01)
*H01Q 1/32* (2006.01)
*H01Q 21/06* (2006.01)

(52) U.S. Cl.

CPC ....... *G01S 13/9041* (2019.05); *H01Q 21/061* (2013.01); *H01Q 1/3233* (2013.01)

(58) Field of Classification Search

CPC . G01S 13/9041; H01Q 1/3233; H01Q 21/061
USPC ........................................................ 342/25 A
See application file for complete search history.

(56) References Cited

U.S. PATENT DOCUMENTS 6,208,287 B1 3/2001 Sikina et al.
9,524,648 B1 12/2016 Gopalakrishnan et al.
11,105,914 B2 8/2021 Sheret
11,463,881 B2 10/2022 Gwilliams
11,532,884 B1 12/2022 Coutts et al.
11,575,198 B2 2/2023 Miers et al.
(Continued)

FOREIGN PATENT DOCUMENTS

WO 2007014333 A2 2/2007
WO 2014057234 A1 4/2014
WO 2024220735 A1 10/2024

OTHER PUBLICATIONS

S.M. Sherman et al., "Monopulse Principles and Techniques," Artech House, 2011, 419 Pages.

*Primary Examiner* — Brady W Frazier
(74) *Attorney, Agent, or Firm* — Ryan, Mason & Lewis, LLP

(57) ABSTRACT

A method comprises transmitting a transmit signal via a transmit phased array antenna of a radar system, and receiving at least respective first and second receive signals via at least respective first and second sub-arrays of a receive phased array antenna of the radar system. The first sub-array is electronically steered utilizing a first type of squinting and the second sub-array is electronically steered using a second type of squinting. The method further comprises processing the first and second receive signals through respective first and second receive signal paths to generate respective first and second digital receive signals, computing respective first and second sets of range-Doppler information for the respective first and second digital receive signals, determining range and velocity for a target based at least in part on a combination of at least portions of the first and second sets of range-Doppler information, and computing azimuth and elevation angles.

20 Claims, 7 Drawing Sheets

(56) References Cited

U.S. PATENT DOCUMENTS

| | | | |
|---|---|---|---|
| 11,808,834 | B2 | 11/2023 | Horng et al. |
| 12,069,487 | B1 | 8/2024 | Nobbe |
| 2007/0047560 | A1 | 3/2007 | Tsai et al. |
| 2018/0074183 | A1 | 3/2018 | Sheret |
| 2018/0115342 | A1 | 4/2018 | Doane et al. |
| 2018/0284254 | A1 | 10/2018 | Vacanti et al. |
| 2020/0028261 | A1 | 1/2020 | Foo |
| 2020/0067184 | A1 | 2/2020 | Arnett et al. |
| 2020/0202386 | A1 | 6/2020 | Fowe et al. |
| 2021/0024211 | A1 | 1/2021 | Peitzer et al. |
| 2021/0048501 | A1 | 2/2021 | Hu |
| 2021/0143862 | A1 | 5/2021 | Nardozza |
| 2021/0184723 | A1 | 6/2021 | Brighenti |
| 2021/0344399 | A1 | 11/2021 | Levy et al. |
| 2022/0268886 | A1 | 8/2022 | Shamsinejad |
| 2022/0320727 | A1 | 10/2022 | Molla Aghajanzadeh et al. |
| 2023/0081094 | A1 | 3/2023 | Huang et al. |
| 2023/0188182 | A1 | 6/2023 | Choi et al. |
| 2023/0296760 | A1 | 9/2023 | Molchanov |
| 2023/0352840 | A1 | 11/2023 | Tian et al. |
| 2024/0201367 | A1 | 6/2024 | Nobbe et al. |
| 2024/0204420 | A1 | 6/2024 | Dunsmore et al. |
| 2024/0219552 | A1* | 7/2024 | Ludlow ................. G01S 13/347 |
| 2024/0248199 | A1 | 7/2024 | Molchanov |
| 2025/0012892 | A1 | 1/2025 | Kling et al. |
| 2025/0035773 | A1 | 1/2025 | Nobbe et al. |

* cited by examiner

RADAR SYSTEM WITH SPLIT RECEIVE PHASED ARRAY ANTENNA

TECHNICAL FIELD

Aspects of the present disclosure relate generally to radar systems, and more particularly to radar systems with phased array antennas.

BACKGROUND

A wide variety of different types of radar systems are known, including, by way of example, various monopulse radar systems. Monopulse radar systems are generally configured to extract both range and direction information of a given target, illustratively from a single signal pulse, although use of pulsed signals is not required in such systems. Some monopulse radar systems determine the direction information utilizing a monopulse ratio, which includes both amplitude and phase information.

SUMMARY

Illustrative embodiments disclosed herein provide a radar system with a split receive phased array antenna in which different portions of the split receive phased array antenna are processed in respective different receive signal paths. For example, some embodiments provide a radar system that can achieve significantly better angle-of-arrival (AOA) resolution for a detected target in two orthogonal dimensions than would otherwise be possible using conventional approaches. Moreover, this improved AOA resolution can be provided utilizing only two receive signal paths, while also substantially reducing corresponding radar system cost, size and power consumption.

In one embodiment, a method comprises transmitting a transmit signal via a transmit phased array antenna of a radar system, and receiving at least respective first and second receive signals via at least respective first and second sub-arrays of a receive phased array antenna of the radar system, wherein the first sub-array is electronically steered utilizing a first type of squinting and the second sub-array is electronically steered using a second type of squinting different than the first type of squinting. The method further comprises processing the first and second receive signals through respective first and second receive signal paths to generate respective first and second digital receive signals, computing respective first and second sets of range-Doppler information for the respective first and second digital receive signals, determining range and velocity for a target based at least in part on a combination of at least portions of the first and second sets of range-Doppler information, computing an azimuth angle for the target based at least in part on phase information of the respective first and second digital receive signals, computing an elevation angle for the target based at least in part on magnitude information of the respective first and second digital receive signals, and outputting at least a subset of the range, velocity, azimuth angle and elevation angle for the target.

In some embodiments, the first type of squinting comprises a first amount of squinting in one of an upward elevation direction and a downward elevation direction and the second type of squinting comprises a second amount of squinting in the other of the upward elevation direction and the downward elevation direction. Additionally or alternatively, the first and second amounts of squinting may be substantially equivalent to one another. Other types and arrangements of squinting of the first and second sub-arrays of the receive phased array antenna can be used in other embodiments.

In some embodiments, generating the transmit signal comprises generating the transmit signal from a corresponding digital transmit signal in a transmit signal path of the radar system, with the transmit signal path comprising a serial arrangement of at least a transmit digital-to-analog converter (DAC), a transmit mixer, and a transmit beamformer coupled to the transmit phased array antenna.

The first and second sub-arrays of the receive phased array antenna in some embodiments each comprise a same number and arrangement of antenna elements, although numerous other sub-array configurations are possible. For example, the receive phased array antenna in some embodiments may comprise a square array of antenna elements, with the first and second sub-arrays of the receive phased array antenna comprising respective first and second halves of the square array of antenna elements. As a more particular example, the receive phased array antenna may comprise a four-by-four array of antenna elements, with the first and second sub-arrays of the receive phased array antenna comprising respective two-by-four sub-arrays of the four-by-four array. Again, numerous other receive phased array antenna arrangements can be used in other embodiments.

In some embodiments, the target is detected at least in part by summing the first and second sets of range-Doppler information, and identifying a signal of interest in the summed first and second sets of range-Doppler information utilizing a constant false alarm rate (CFAR) algorithm, although other target detection techniques can be used in other embodiments.

Each of the first and second receive signal paths in some embodiments comprises a serial arrangement of at least a receive beamformer coupled to the corresponding sub-array of the receive phased array antenna, a receive mixer and a receive analog-to-digital converter (ADC).

Additionally or alternatively, processing the first and second receive signals through respective first and second receive signal paths to generate respective first and second digital receive signals illustratively comprises demodulating the first and second receive signals in the respective first and second receive signal paths.

In some embodiments, computing an azimuth angle for the target based at least in part on phase information of the respective first and second digital receive signals illustratively comprises computing the azimuth angle based at least in part on a phase difference between the first and second digital receive signals.

Additionally or alternatively, computing an elevation angle for the target based at least in part on magnitude information of the respective first and second digital receive signals illustratively comprises computing the elevation angle based at least in part on an amplitude difference between the first and second digital receive signals.

Some embodiments are configured to perform one or more calibration operations relating to at least one of the first and second digital receive signals. For example, such calibration operations can include applying one or more calibration corrections digitally to at least one of the first and second digital receive signals before computing the first and second sets of range-Doppler information for the respective first and second digital receive signals. Other examples of calibration operations that are performed in some embodiments include generating one or more calibration coefficients at least in part as a function of a beam pointing angle, and equalizing or otherwise normalizing at least respective portions of the first receive signal path and the second receive signal path. Such normalization in some embodiments comprises performing complex normalization to normalize gain and phase of the first and second receive signal paths.

It is to be appreciated that the foregoing arrangements are only examples, including examples of potential applications of the disclosed techniques, and numerous alternative arrangements are possible.

These and other illustrative embodiments include but are not limited to systems, methods, apparatus, processing devices, integrated circuits, and computer program products comprising processor-readable storage media having software program code embodied therein.

DETAILED DESCRIPTION

Illustrative embodiments include radar systems comprising transmit and receive phased array antennas. Such radar systems in some embodiments can be implemented as at least a portion of an information processing system that comprises one or more computers, servers or other processing devices. For example, a given radar system of the type disclosed herein can be integrated into an information processing system that includes one or more additional radar systems and/or other types of sensor systems of potentially different sensor modalities, such as optical, infrared (IR), thermal, etc. As a more particular example, a radar system as disclosed herein can be deployed on a drone or on another type of aerial or terrestrial vehicle, and in numerous other use cases without limitation. A number of examples of illustrative radar systems and corresponding signal processing operations will be described in detail herein. It should be understood, however, that the techniques disclosed herein are more generally applicable to a wide variety of other types of radar systems and associated processing devices and other components. Accordingly, the term "radar system" as used herein is intended to be broadly construed so as to encompass these and other arrangements.

Figure 1:
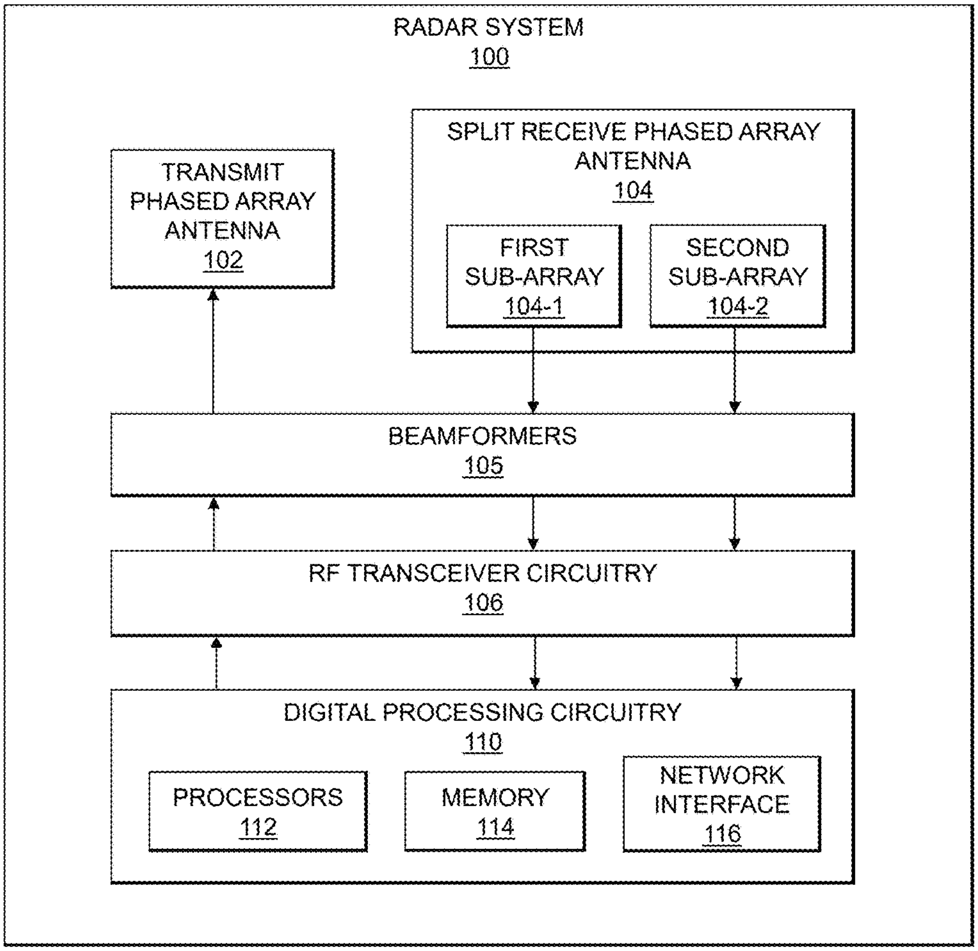
FIG. 1 is a block diagram of an example radar system with a split receive phased array antenna in an illustrative embodiment.

FIG. 1 shows an example radar system 100 in an illustrative embodiment. The radar system 100 comprises a transmit phased array antenna 102 and a receive phased array antenna 104. The receive phased array antenna 104 is an example of what is also referred to herein as a "split" receive phased array antenna, as it includes a plurality of separate sub-arrays, illustratively at least first and second sub-arrays 104-1 and 104-2 as shown. It is to be appreciated that the term "split" as used in this context herein is intended to be broadly construed, and should not be viewed as requiring separation into physically-separable components. More generally, the term is intended to encompass any receive phased array antenna in which respective different subsets of the antenna elements, each considered a separate sub-array, are coupled to respective different receive signal paths for processing of received signals. In other embodiments, the receive phased array antenna 104 may comprise more than two separate sub-arrays, instead of just the first and second sub-arrays 104-1 and 104-2 as shown in the figure.

The transmit phased array antenna 102 and the receive phased array antenna 104 in some embodiments are implemented as respective planar arrays of patch antenna elements, although other types and arrangements of phased array antennas and their associated antenna elements can be used in other embodiments. As one example, each of the transmit phased array antenna 102 and the receive phased array antenna 104 in some embodiments include substantially the same number, type and arrangement of antenna elements.

The transmit phased array antenna 102 and the receive phased array antenna 104 respectively transmit and receive at substantially the same time, in what is generally referred to herein as a type of "monopulse" arrangement, although, as indicated previously, use of pulsed signals is not required in such arrangements.

The radar system 100 in some embodiments is implemented as a frequency modulated continuous wave (FMCW) radar system operating in a millimeter wave frequency band. For example, the radar system 100 in some embodiments is configured to operate with a center frequency $f_c$ of about 24.45 to 24.65 GHz modulated by a 40 MHz chirp signal, although numerous other operating frequencies, modulation types and other parameters can be used in other embodiments.

The radar system 100 further comprises a plurality of beamformers 105, illustratively including a transmit beamformer for driving the transmit phased array antenna 102 and first and second receive beamformers for driving the respective first and second sub-arrays 104-1 and 104-2 of the receive phased array antenna 104. Each such transmit or receive beamformer generally includes a separate set of adjustable gain and phase elements for each antenna element of the transmit or receive phased array antenna, for adjusting corresponding amplitude and phase values for respective transmit or receive signals applied to those antenna elements in order to steer the corresponding antenna beam. For example, the antenna beams may be periodically scanned across a designated field of view and/or may be controlled to track one or more detected targets using closed-loop tracking mechanisms. In some embodiments, location information obtained from a global positioning system (GPS) receiver, orientation information obtained from an internal measurement unit (IMU) and/or various other types of information accessible to the radar system 100, can be used to at least partially control beam steering directions of the transmit and receive phased array antennas. The beamformers 105 in some embodiments are implemented utilizing one or more beamformer integrated circuits.

The beamformers 105 are coupled to RF transceiver circuitry 106 and digital processing circuitry 110 as shown. The RF transceiver circuitry 106 in some embodiments comprises one or more transceiver RF integrated circuits (RFICs) for processing transmit and receive signals in the radar system 100. The one or more transceiver RFICs may comprise, for example, software-defined radio (SDR) RFICs. The digital processing circuitry 110 includes one or more processors 112, memory 114 and a network interface 116.

Software stored in the memory 114 and executed by the one or more processors 112 is illustratively utilized to control various aspects of the operation of the radar system 100, such as generating transmit signals for transmission via the transmit phased array antenna 102, processing receive signals received via the respective first and second sub-arrays 104-1 and 104-2 of the receive phased array antenna 104, and electronically steering the corresponding antenna beams. Outputs generated by the radar system 100 may be transmitted over one or more networks to one or more other system devices, such as a display terminal, via the network interface 116. For example, such outputs may be combined in a processing platform of an associated information processing system with outputs of one or more other radar systems and/or sensor outputs of other sensor modalities.

In operation, the radar system 100 is configured to generate a transmit signal, to transmit the transmit signal via the transmit phased array antenna 102, and to receive at least respective first and second receive signals via at least the respective first and second sub-arrays 104-1 and 104-2 of the receive phased array antenna 104.

The first and second sub-arrays 104-1 and 104-2 of the receive phased array antenna 104 in some embodiments each comprise a same number and arrangement of antenna elements, although other arrangements of antenna elements are possible. For example, the receive phased array antenna 104 in some embodiments comprises a square array of antenna elements and the first and second sub-arrays 104-1 and 104-2 of the receive phased array antenna 104 comprise respective first and second halves of the square array of antenna elements. As a more particular example, the receive phased array antenna 104 may comprise a four-by-four array of antenna elements, with the first and second sub-arrays 104-1 and 104-2 comprising respective two-by-four sub-arrays of the four-by-four array, as will be described in more detail below in conjunction with the embodiments of FIGS. 2 and 4. The transmit phased array antenna 102 in some embodiments has the same number and type of antenna elements as the receive phased array antenna 104, but without separate sub-arrays. For example, in an embodiment in which the receive phased array antenna 104 comprises a four-by-four array of antenna elements, the transmit phased array antenna 102 may similarly comprise a four-by-four array of antenna elements. Again, numerous other arrangements are possible.

In some embodiments, the first sub-array 104-1 is electronically steered utilizing a first type of squinting and the second sub-array 104-2 is electronically steered using a second type of squinting different than the first type of squinting. Terms such as "squint" and "squinting" as used herein are intended to be broadly construed so as to encompass, for example, deliberately introducing an amount of angular directional offset of the antenna beam in a particular pointing direction relative to a boresight of the phased array antenna, where the boresight corresponds to 0° azimuth and 0° elevation.

For example, in some embodiments, the first type of squinting comprises a first amount of squinting in one of an upward elevation direction and a downward elevation direction and the second type of squinting comprises a second amount of squinting in the other of the upward elevation direction and the downward elevation direction. As a more particular example, the first sub-array 104-1 may be squinted in an upward elevation direction (e.g., +10° in elevation) and the second sub-array 104-2 may be squinted in a downward elevation direction (e.g., −10° in elevation), or vice versa. Accordingly, in some embodiments, the first and second amounts of squinting of the respective first and second sub-arrays 104-1 and 104-2 are substantially equivalent to one another (e.g., both are 10°), but are in respective different directions (e.g., upward and downward in elevation).

In some embodiments in which the squinting of the first and second sub-arrays 104-1 and 104-2 is in elevation (e.g., upward and downward respectively in elevation), there is illustratively no squinting introduced in azimuth. In other words, the antenna beams of the first and second sub-arrays 104-1 and 104-2 point in the same azimuth direction.

Other squinting arrangements can be implemented in other embodiments. For example, one of the first and second sub-arrays 104-1 and 104-2 can be configured with a non-zero amount of squint in a particular direction, and the other of the first and second sub-arrays 104-1 and 104-2 can be configured with a substantially zero amount of squint. The term "amount of squint" as applied to either one of the two sub-arrays of the receive phased array antenna 104 as used herein is therefore intended to be broadly construed so as to encompass, for example, a zero or substantially zero amount of squint introduced for one of the two sub-arrays, while a non-zero amount of squint is introduced for the other one of the two sub-arrays, so as to provide a differential squinting between the sub-arrays. Again, numerous other arrangements are possible for introducing a differential squint between multiple sub-arrays of a receive phased array antenna as disclosed herein.

The radar system 100 is configured to generate the above-noted transmit signal from a corresponding digital transmit signal in a transmit signal path of the radar system 100. The transmit signal path illustratively comprises a serial arrangement of at least a transmit digital-to-analog converter (DAC), a transmit mixer, and a transmit beamformer coupled to the transmit phased array antenna 102. The transmit DAC and transmit mixer are illustratively part of a transmit path portion of the RF transceiver circuitry 106, and the transmit beamformer is implemented as one of the beamformers 105. The digital transmit signal is illustratively generated using the one or more processors 112 of the digital processing circuitry 110.

The radar system 100 is further configured to process the above-noted first and second receive signals from the respective first and second sub-arrays 104-1 and 104-2 through respective first and second receive signal paths to generate respective first and second digital receive signals. Each of the first and second receive signal paths illustratively comprises a serial arrangement of at least a receive beamformer coupled to the corresponding sub-array 104-1 or 104-2 of the receive phased array antenna 104, a receive mixer and a receive analog-to-digital converter (ADC). The receive mixer and the receive DAC are illustratively part of a receive path portion of the RF transceiver circuitry 106, and the receive beamformer is implemented as one of the beamformers 105. In some embodiments, processing the first and second receive signals through the respective first and second receive signal paths to generate the respective first and second digital receive signals comprises demodulating the first and second receive signals in the respective first and second receive signal paths, illustratively using the RF transceiver circuitry 106. The first and second digital receive signals are illustratively processed using the one or more processors 112 of the digital processing circuitry 110.

The radar system 100 is further configured to compute respective first and second sets of range-Doppler information for the respective first and second digital receive signals, and to determine range and velocity for a target based at least in part on a combination of at least portions of the first and second sets of range-Doppler information. These operations are illustratively performed in the digital processing circuitry 110 utilizing the one or more processors 112. The first and second sets of range-Doppler information in some embodiments comprise respective first and second range-Doppler maps, although other types and arrangements of range-Doppler information can be used. The term "range-Doppler information" as used herein is therefore intended to be broadly construed, so as to encompass, for example, one or more data structures that capture such information as it is obtained within the radar system 100. Also, the term "target" as used herein is intended to be broadly construed, and should not be viewed as requiring a particular detection arrangement, such as detection to a particular level of resolution or detection accuracy.

In some embodiments, the target is detected at least in part by summing the first and second sets of range-Doppler information, and identifying a signal of interest in the summed first and second sets of range-Doppler information utilizing a constant false alarm rate (CFAR) algorithm. Other target detection techniques can be used in other embodiments.

The radar system 100 is also configured to compute an azimuth angle for the target based at least in part on phase information of the respective first and second digital receive signals, and to compute an elevation angle for the target based at least in part on magnitude information of the respective first and second digital receive signals. Such information collectively provides an angle-of-arrival (AOA) for the target in two orthogonal directions. The corresponding azimuth and elevation angle computation operations are also illustratively performed in the digital processing circuitry 110 utilizing the one or more processors 112.

Computing an azimuth angle for the target based at least in part on phase information of the respective first and second digital receive signals illustratively comprises computing the azimuth angle based at least in part on a phase difference between the first and second digital receive signals. For example, an azimuth angle $\theta_{az}$ can be computed utilizing a phase difference in accordance with the following relationship:

$$\theta_{az} \propto \frac{\phi_{RX1} - \phi_{RX2}}{\phi_{RX1} + \phi_{RX2}}$$

where $\phi_{RX1}$ denotes the phase of the first digital receive signal, $\phi_{RX2}$ denotes the phase of the second digital receive signal, and the symbol $\propto$ denotes "is proportional to." The actual computation of the azimuth angle in some embodiments is implemented as a complex function with non-linearities and non-idealities that are compensated through characterization and calibration processes and/or lookup tables.

For example, in some embodiments, an angle $\theta$ from the target is illustratively related to the phase difference $\Delta\phi$ between the phases $\phi_{RX1}$ and $\phi_{RX2}$ of the respective first and second digital receive signals as follows:

$$\Delta\phi = (2\pi/\lambda)d\sin(\theta)$$

$$\theta = \operatorname{asin}\left(\frac{\lambda\Delta\phi}{2\pi d}\right)$$

where $\lambda$ denotes signal wavelength, d denotes a distance between respective center points of the first and second sub-arrays, corresponding to their respective boresights, and asin(•) denotes the arcsine function.

Computing an elevation angle for the target based at least in part on magnitude information of the respective first and second digital receive signals illustratively comprises computing the elevation angle based at least in part on an amplitude difference between the first and second digital receive signals.

For example, an elevation angle $\theta_{el}$ can be computed utilizing an amplitude difference in accordance with the following relationship:

$$\theta_{el} \propto \left|\frac{A_{RX1} - A_{RX2}}{A_{RX1} + A_{RX2}}\right|$$

where $A_{RX1}$ denotes the amplitude of the first digital receive signal and $A_{RX2}$ denotes the amplitude of the second digital receive signal. Like the azimuth angle computation, the actual computation of the elevation angle in some embodiments is implemented as a complex function with non-linearities and non-idealities that are compensated through characterization and calibration processes and/or lookup tables.

These example arrangements advantageously provide a finer AOA resolution than would otherwise be possible, illustratively an AOA resolution of approximately 3° to 5°, utilizing only two receive signal paths, while also reducing radar system cost, size and power consumption. Illustrative embodiments disclosed herein therefore utilize a combination of phase and amplitude information to achieve a finer AOA resolution in two orthogonal directions than would otherwise be possible, and using only two receive signal paths.

Other techniques can be used to compute azimuth and elevation angles for a detected target based at least in part on phase and amplitude of the first and second digital receive signals in other embodiments.

The radar system 100 is additionally configured to output at least a subset of the range, velocity, azimuth angle and elevation angle for the target. For example, such values or subsets thereof can be output by one portion of the digital processing circuitry 110 to another portion of the digital processing circuitry 110 for further processing. Additionally or alternatively, such values generated in the radar system 100 can be output from a given one of the processors 112 for storage in the memory 114 and/or for delivery via the network interface 116 to an external system or component. The external system or component may comprise, for example, a processing platform configured to fuse outputs of the radar system 100 with outputs of other radar systems and/or other sensors utilizing other sensor modalities. As another example, the external system or component may comprise an automated tracking system and/or a display for presenting the values to a user. At least portions of these and other systems or components can be at least partially implemented within the radar system 100 in other embodiments.

As indicated previously, the term "radar system" as used herein is intended to be broadly construed.

Examples of additional processing operations that are implemented in the radar system 100 in illustrative embodiments include various types of calibration operations relating to at least one of the first and second digital receive signals. Such calibration operations can include, for example, applying one or more calibration corrections digitally to at least one of the first and second digital receive signals in the digital processing circuitry 110, before computing the first and second sets of range-Doppler information for the respective first and second digital receive signals. Additionally or alternatively, such calibration operations can include generating one or more calibration coefficients at least in part as a function of a beam pointing angle and/or equalizing or otherwise normalizing at least respective portions of the first receive signal path and the second receive signal path, where the term "normalizing" is broadly used herein to encompass equalizing and other arrangements. For example, equalizing or otherwise normalizing at least respective portions of the first and second receive signal paths in some embodiments can comprise performing complex normalization to normalize gain and phase of the first and second receive signal paths.

Accordingly, in some embodiments, calibrations performed by the digital processing circuitry 110 can include, for example, performing corrections on at least portions of one or both receive signal paths before and/or after computing the range-Doppler information, performing corrections depending on where the antenna beam is pointing, correcting phase and/or amplitude of one or both of the receive signals, as well as performing additional or alternative calibration operations.

Again, it is to be appreciated that the particular arrangements of FIG. 1 are presented by way of example only, to illustrate possible implementations of an example radar system as disclosed herein, and should not be viewed as limiting in any way.

Additional details regarding illustrative embodiments will now be described in conjunction with FIGS. 2 through 7.

Figure 2:
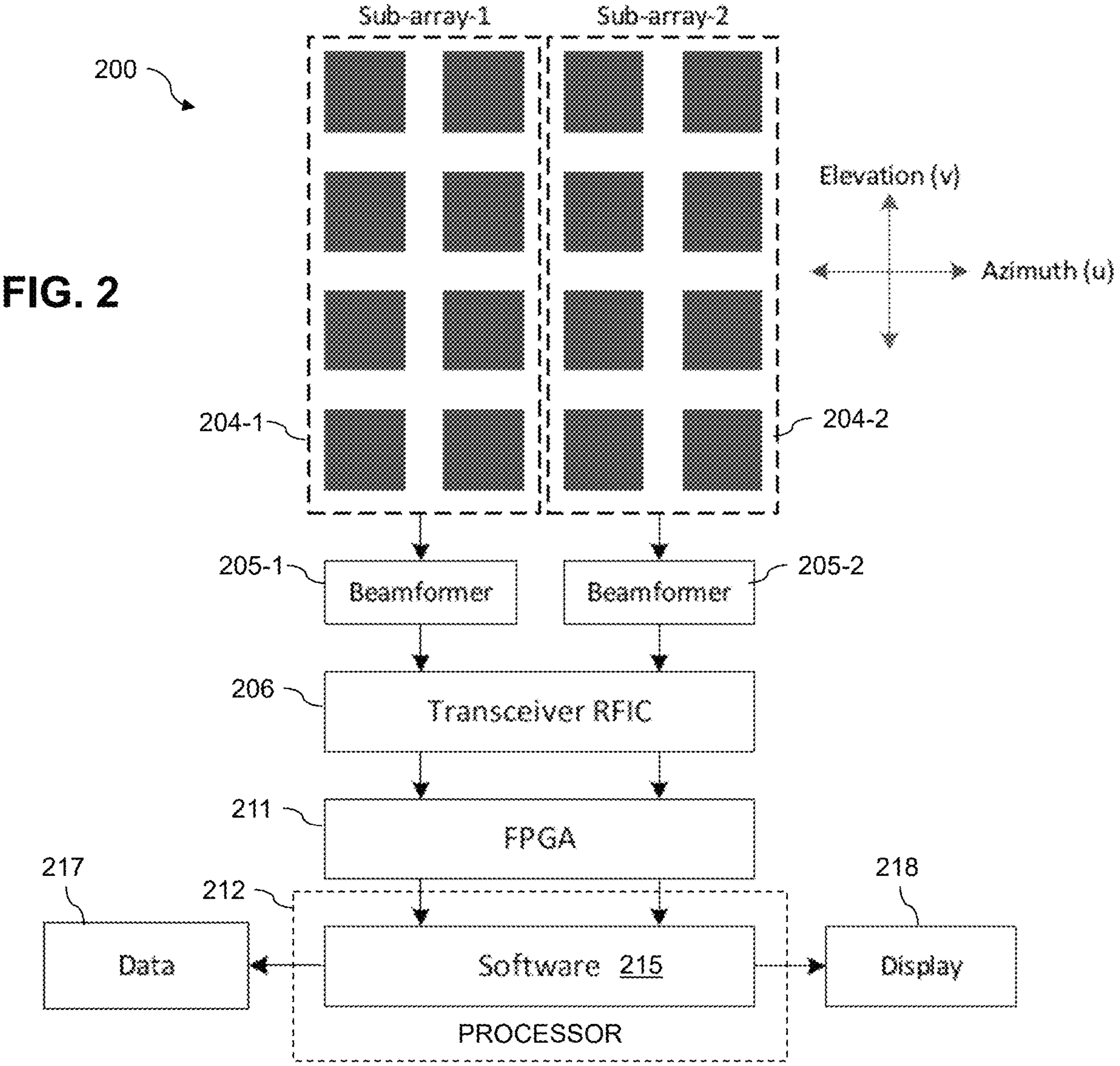
FIG. 2 is a block diagram of an example receiver in a radar system with a split receive phased array antenna in an illustrative embodiment.

Referring now to FIG. 2, an example receiver 200 of a radar system in accordance with an illustrative embodiment is shown. The receiver 200 in this embodiment includes a split receive phased array antenna that includes a first sub-array 204-1 and a second sub-array 204-2, which are also denoted in the figure as Sub-array-1 and Sub-array-2, respectively. The first and second sub-arrays 204-1 and 204-2 of the receive phased array antenna in this embodiment each comprise a same number and arrangement of antenna elements. More particularly, the receive phased array antenna comprises a four-by-four array of 16 antenna elements and the first and second sub-arrays 204-1 and 204-2 of the receive phased array antenna comprise respective two-by-four sub-arrays of 8 elements each, arranged as shown. Example azimuth and elevation directions are also shown in the figure for the receive phased array antenna, with azimuth and elevation also being denoted as u and v, respectively.

The corresponding transmit phased array antenna, not shown in this figure, may also utilize a four-by-four array of 16 antenna elements. In such an embodiment, the radar system includes two 16-element phased array antennas, one for transmit and one for receive. Such an arrangement in an FMCW radar system illustratively provides a fairly broad beamwidth, for example, a beamwidth of approximately 28° by 28°. However, as noted above, the techniques disclosed herein can provide a finer resolution for AOA while also reducing the number of receive signal paths as well as radar system cost, size and power consumption. More particularly, as previously described, some embodiments utilize a combination of phase and amplitude information to achieve finer AOA resolution in two orthogonal directions using only two receive signal paths. For example, some embodiments are configured to provide improved AOA resolution of approximately 3° to 5°, although it is to be appreciated that other AOA resolution values could be provided in other embodiments.

As indicated above, in the receiver 200, the 16-element receive phased array antenna is divided into the two 8-element sub-arrays 204-1 and 204-2, each associated with a different receive signal path. The first receive signal path for processing a first receive signal from the first sub-array 204-1 includes a first receive beamformer 205-1 and corresponding first receive signal path portions through transceiver RFIC 206 and field-programmable gate array (FPGA) 211 to processor 212. Similarly, the second receive signal path for processing a second receive signal from the second sub-array 204-2 includes a second receive beamformer 205-2 and corresponding second receive signal path portions through transceiver RFIC 206 and FPGA 211 to processor 212. The receiver 200 further includes software 215 executing on the processor 212. The processor 212 generates output data 217 at least portions of which may be presented on a display 218.

In this embodiment, the antenna beams of the first and second sub-arrays 204-1 and 204-2 are electronically steered utilizing respective different first and second types of squinting. More particularly, the sub-array beams are respectively squinted up and down relative to one another (e.g., by +10° and −10° respectively) in the elevation direction, but the two sub-array beams point in the same azimuth direction.

Also, phase comparison between first and second digital receive signals is used to determine the azimuth angle providing the AOA in the azimuth direction, while amplitude comparison between the first and second digital receive signals is simultaneously used to determine the elevation angle providing the AOA in the elevation direction.

Figure 3:
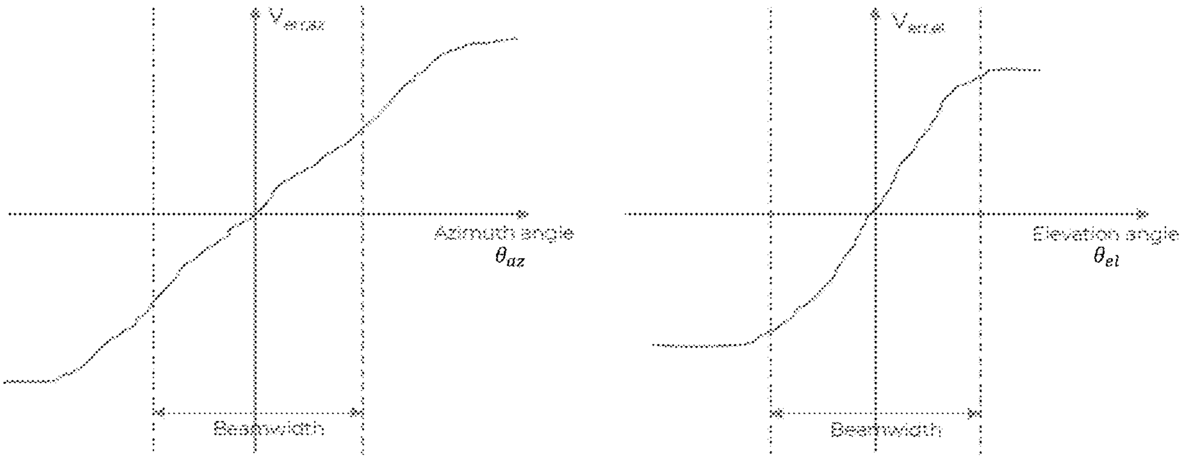
FIG. 3 shows example plots of monopulse error functions for azimuth and elevation in an illustrative embodiment.

Referring now to FIG. 3, example plots of monopulse error functions are shown for azimuth and elevation in an illustrative embodiment. More particularly, the plot on the left side of the figure illustrates azimuth error voltage $V_{err,az}$ as a function of azimuth angle $\theta_{az}$, and the plot on the right side of the figure illustrates elevation error voltage $V_{err,el}$ as a function of elevation angle $\theta_{el}$.

In this illustrative embodiment, example signals generated in the receiver 200 illustratively comprise the above-noted respective azimuth and elevation error voltages that vary monotonically with the AOA of the target with respect to the center of the antenna beam as shown in FIG. 3. Given these error voltages, if the corresponding error functions are known, the AOA relative to beam center can be estimated in azimuth and elevation directions. The receiver 200 illustratively utilizes two such error functions for the two orthogonal beam pointing directions to determine the AOA of the target.

For each of the first and second receive signal paths, the receiver 200 performs functions such as downconversion and demodulation and converts the resulting signal to digital form in an ADC. These operations are illustratively performed in the transceiver RFIC 206 for each of the first and second receive signal paths. The resulting first and second digital receive signals are then further processed in the manner previously described herein to generate the phase information and the amplitude information and to compute therefrom the respective azimuth angle and elevation angle of the AOA, with such processing illustratively being performed in the FPGA 211 and/or the processor 212.

Figure 4:
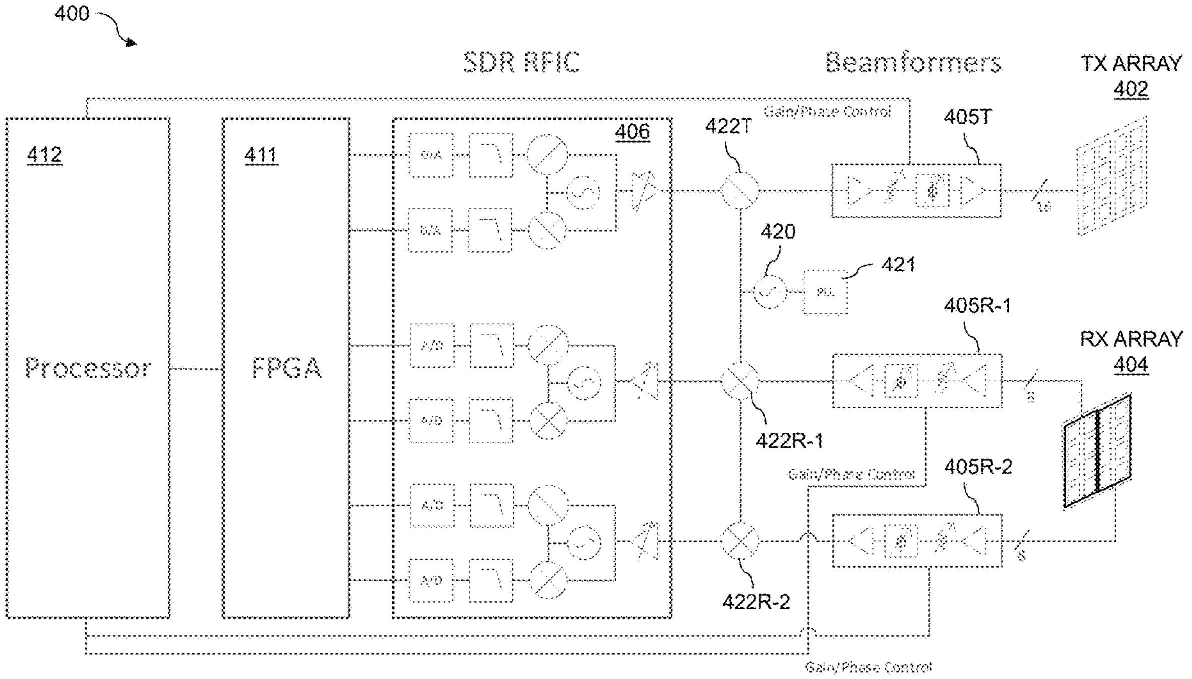
FIG. 4 is a block diagram of another example radar system with a split receive phased array antenna in an illustrative embodiment.

FIG. 4 shows a radar system 400 with a split receive phased array antenna in another illustrative embodiment. The radar system 400 comprises a transmit (TX) array 402 and a receive (RX) array 404, each implemented as a 16-element phased array antenna as previously described herein. The radar system 400 further comprises transmit and receive beamformers, an SDR RFIC 406, an FPGA 411 and a processor 412, interconnected as shown. The components of the transmit and receive beamformers illustratively include adjustable gain and phase blocks 405T, 405R-1 and 405R-2, and may be part of one or more beamformer integrated circuits.

In the transmit signal path, a digital transmit signal is generated using FPGA 411 under the control of the processor 412 and delivered to respective in-phase (I) and quadrature (Q) inputs of the SDR RFIC 406. Each of the I and Q components of the transmit signal is converted from digital to analog in a DAC, filtered in a low-pass filter, and modulated onto a carrier signal via a mixer. The resulting signals are then combined and applied to a variable gain amplifier. A local oscillator (LO) signal generated by LO 420 coupled to a phase-locked loop (PLL) 421 drives one input of a transmit upconverter mixer 422T that receives the combined and amplified transmit signal at its other input. The output of the transmit upconverter mixer 422T drives an adjustable gain and phase block 405T of a transmit beamformer that imparts a desired gain and phase to the transmit signal under the control of a gain/phase control signal from the processor 412, individually for corresponding signal instances transmitted by respective ones of the 16 different antenna elements of the TX array 402.

In the first receive signal path, a first receive signal from the first sub-array of RX array 404 is applied to a first receive beamformer. The first receive beamformer imparts a desired gain and phase to the first receive signal in an adjustable gain and phase block 405R-1 under the control of a gain/phase control signal from the processor 412, individually for corresponding signal instances received by respective ones of the 8 different antenna elements of the first sub-array of the RX array 404. The resulting first receive signal drives one input of a first receive downconverter mixer 422R-1 which receives at its other input the LO signal from the LO 420. The resulting downconverted first receive signal is subject to variable gain amplification and demodulation, with the resulting I and Q components each being filtered in a low-pass filter, converted from analog to digital in an ADC, and applied to the FPGA 411 as respective I and Q components of a first digital receive signal.

In the second receive signal path, a second receive signal from the second sub-array of RX array 404 is applied to a second receive beamformer. The second receive beamformer imparts a desired gain and phase to the second receive signal in an adjustable gain and phase block 405R-2 under the control of a gain/phase control signal from the processor 412, individually for corresponding signal instances received by respective ones of the 8 different antenna elements of the second sub-array of the RX array 404. The resulting second receive signal drives one input of a second receive downconverter mixer 422R-2 which receives at its other input the LO signal from the LO 420. The resulting downconverted second receive signal is subject to variable gain amplification and demodulation, with the resulting I and Q components each being filtered in a low-pass filter, converted from analog to digital in an ADC, and applied to the FPGA 411 as respective I and Q components of a second digital receive signal.

The first and second digital receive signals received over the respective first and second receive signal paths are then subject to further processing in the FPGA 411 and processor 412 in order to determine range and velocity for a target, as well as azimuth angle and elevation angle for an AOA of the target, as will now be described in more detail in conjunction with FIG. 5.

Figure 5:
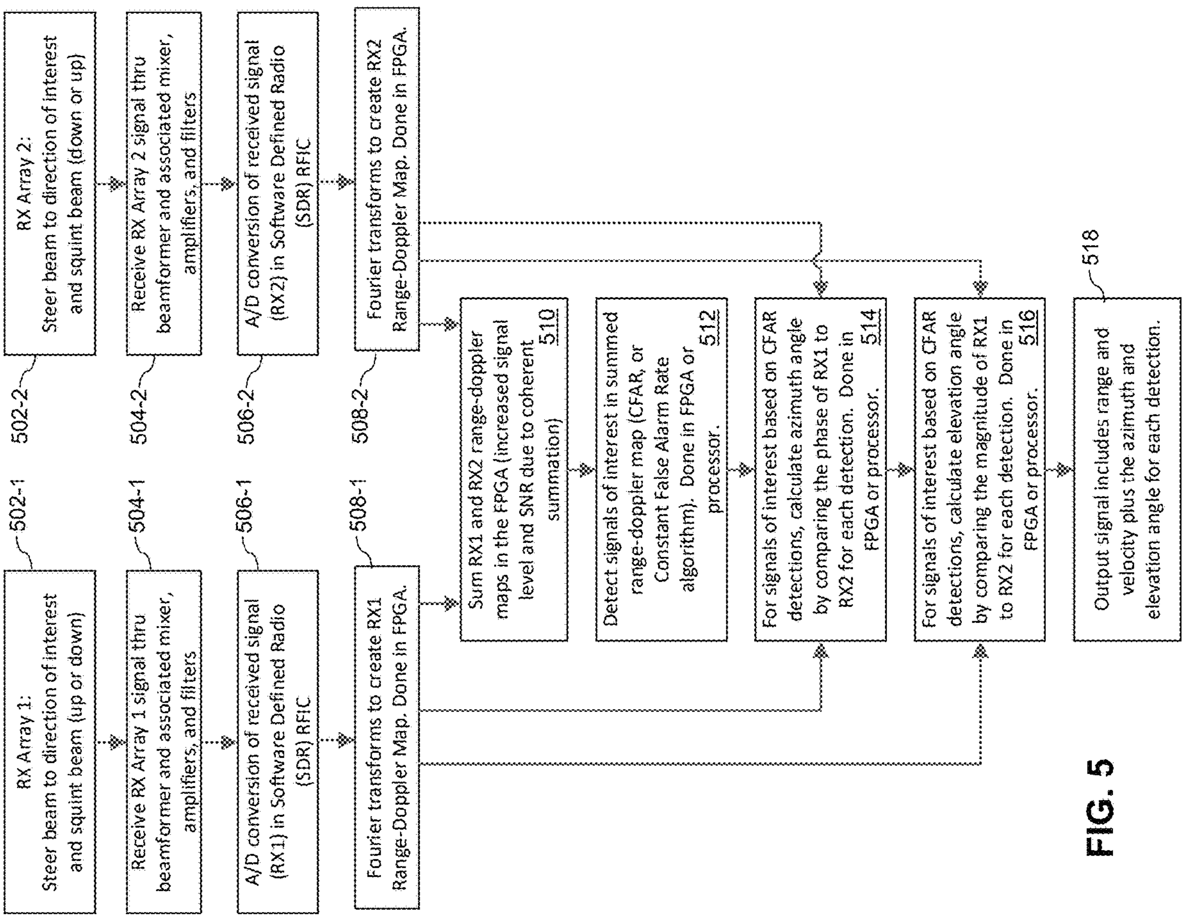
FIG. 5 is a flow diagram of an example target detection process implemented in the radar system of FIG. 4 in an illustrative embodiment.

FIG. 5 shows an example target detection process implemented in the radar system of FIG. 4 in an illustrative embodiment. This example process includes steps 502 through 518, and is illustratively performed by radar system 400, although similar processes can be implemented using other radar systems disclosed herein. The process may be viewed as a radar signal processing algorithm implemented in a receiver of a radar system comprising at least one processor coupled to at least one memory. The at least one processor in the radar system 400 more particularly comprises at least FPGA 411 and processor 412.

For steps 502 through 508 of the FIG. 5 process, there are two separate and parallel processing paths, one for the first sub-array of RX array 404, and another for the second sub-array of RX array 404. The first and second sub-arrays in this embodiment are also denoted in the figure as RX Array 1 and RX Array 2.

The following steps 502-1 through 508-1 are performed for the first sub-array RX Array 1, as follows:

In step 502-1, the antenna beam of RX Array 1 is electronically steered to a particular direction of interest and squinted using a first type of squinting, illustratively one of upward or downward squinting in elevation.

In step 504-1, the first receive signal of RX Array 1 is received through the corresponding first receive beamformer and is further processed through mixers, amplifiers and filters as previously described. The first receive signal is also denoted RX1.

In step 506-1, the first receive signal RX1 is converted from analog to digital, also denoted as A/D conversion, in an ADC of the SDR RFIC 406.

In step 508-1, a first set of range-Doppler information is computed for the first receive signal RX1. The first set of range-Doppler information illustratively comprises a first range-Doppler map, and can be computed by applying Fourier transforms to the first receive signal RX1 in the FPGA 411. The Fourier transforms are illustratively implemented as fast Fourier transforms (FFTs). These and other operations referred to herein as being performed in the FPGA 411 can in other embodiments be performed at least in part in the processor 412. For example, the processor 412 can be used to compute the FFTs.

Similar steps 502-2 through 508-2 are performed, in parallel with the above steps, for the second sub-array RX Array 2, as follows:

In step 502-2, the antenna beam of RX Array 2 is electronically steered to a particular direction of interest and squinted using a second type of squinting, illustratively one of downward or upward squinting in elevation, that is, opposite to the upward or downward squinting used for RX Array 1 in step 502-1.

In step 504-2, the second receive signal of RX Array 2 is received through the corresponding second receive beamformer and is further processed through mixers, amplifiers and filters as previously described. The second receive signal is also denoted RX2.

In step 506-2, the second receive signal RX2 is converted from analog to digital, also denoted as A/D conversion, in an ADC of the SDR RFIC 406.

In step 508-2, a second set of range-Doppler information is computed for the second receive signal RX2. The second set of range-Doppler information illustratively comprises a second range-Doppler map, and can be computed by applying Fourier transforms (e.g., FFTs) to the second receive signal RX2 in the FPGA 411. Again, these and other operations referred to herein as being performed in the FPGA 411 can in other embodiments be performed at least in part in the processor 412.

The remaining steps 510 through 518 in the process involve further processing of the range-Doppler maps created for the first and second receive signals RX1 and RX2, as follows:

In step 510, the first and second range-Doppler maps for the respective first and second receive signals RX1 and RX2 are summed, illustratively in the FPGA 411. Coherent summation of the first and second range-Doppler maps is used to provide increased signal level and thereby increased signal-to-noise ratio (SNR).

In step 512, one or more signals of interest are detected in the summed range-Doppler map, illustratively utilizing a CFAR algorithm. This operation can be performed in the FPGA 411 or the processor 412.

In step 514, for each of one or more signals of interest based on respective CFAR detections, an azimuth angle is calculated based at least in part on a comparison of the phase of RX1 to the phase of RX2 in the corresponding detection. This operation can be performed in the FPGA 411 or the processor 412.

In step 516, for each of the one or more signals of interest based on the respective CFAR detections, an elevation angle is calculated based at least in part on a comparison of the magnitude of RX1 to the magnitude of RX2 in the corresponding detection. This operation can be performed in the FPGA 411 or the processor 412.

In step 518, one or more output signals are generated that illustratively include the range, velocity, azimuth angle and elevation angle for each detection.

The particular steps as illustrated in the FIG. 5 process are presented by way of illustrative example only, and should not be viewed as limiting in any way. In other embodiments, additional or alternative steps may be used, and the ordering of the steps can be varied relative to the particular ordering shown in the figure. For example, certain steps shown as being performed in serial order in the figure may instead be performed at least in part in parallel with one another in other embodiments.

Figure 6A:
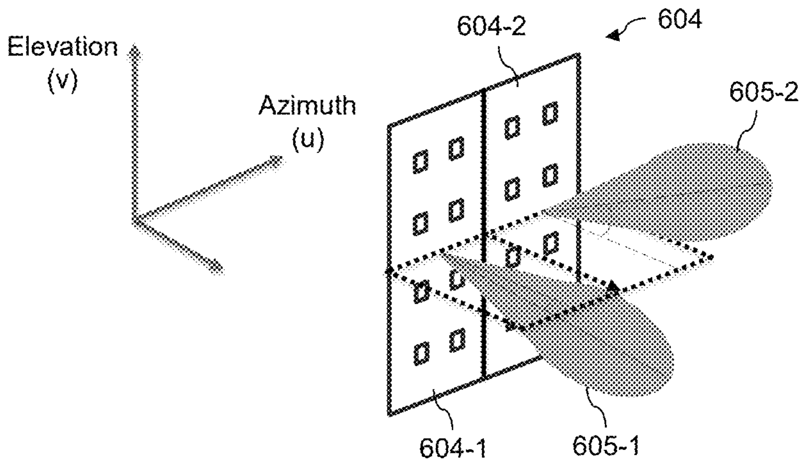
FIGS. 6A and 6B show example antenna beams generated in illustrative embodiments. These figures are collectively referred to herein as FIG. 6.
Figure 6B:
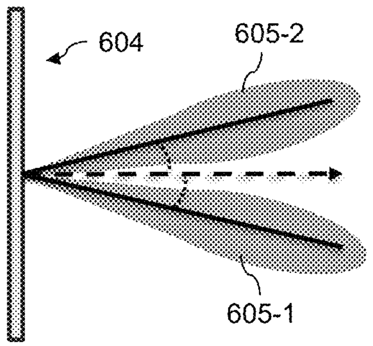

Referring now to FIG. 6, examples of antenna beams generated in illustrative embodiments are shown in FIGS. 6A and 6B.

FIG. 6A shows a three-dimensional view of a split receive phased array antenna 604 comprising first and second sub-arrays 604-1 and 604-2. The receive phased array antenna illustratively comprises a four-by-four array of 16 antenna elements, with the first and second sub-arrays of the receive phased array antenna comprising respective two-by-four sub-arrays of 8 antenna elements each.

In this embodiment, first and second receive antenna beams 605-1 and 605-2 are generated through electronic steering of the respective first and second sub-arrays 604-1 and 604-2, utilizing respective receive beamformers, to provide a first type of squinting for the first sub-array 604-1 and a second type of squinting, different than the first type of squinting, for the second sub-array 604-2.

More particularly, in this illustrative embodiment, the first type of squinting of the antenna beam 605-1 comprises a first amount of squinting in a downward elevation direction and the second type of squinting of the antenna beam 605-2 comprises a second amount of squinting in the upward elevation direction, as illustrated. The amounts of squinting are illustratively on the order of −10° and +10° respectively, although other values and squinting directions could be used in other embodiments.

FIG. 6B shows a side view of the split receive phased array antenna 604 comprising the first and second sub-arrays 604-1 and 604-2. In this view, the respective downward and upward squinting of the antenna beams 605-1 and 605-2 of the respective first and second sub-arrays are shown, illustrating the respective squint angles relative to antenna boresight.

Figure 7:
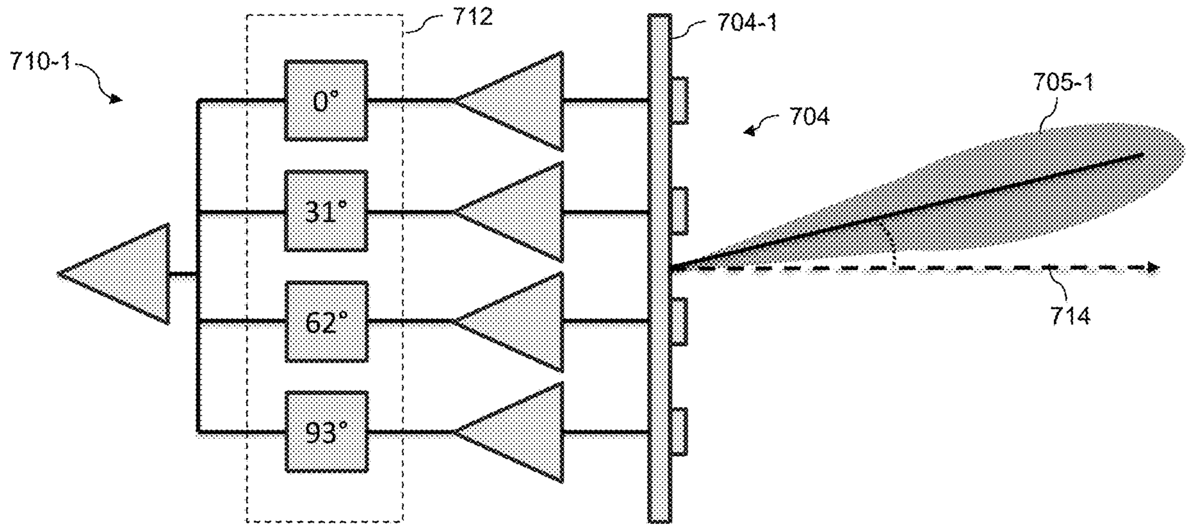
FIG. 7 shows signal processing associated with an example squinted antenna beam in an illustrative embodiment.

FIG. 7 shows signal processing associated with an example squinted antenna beam in an illustrative embodiment. In this embodiment, a first sub-array 704-1 of a split receive phased array antenna 704 is electronically steered by a receive beamformer 710-1 that includes a plurality of amplifiers and associated controllable phase shifters 712 arranged as shown. A squint is introduced in an antenna beam 705-1 of the first sub-array 704-1 through adjustment of phase values of controllable phase shifters 712, each of which is coupled via an amplifier to a corresponding antenna element in one column of antenna elements of the first sub-array 704-1. Such controllable phase shifters 712 and associated amplifiers in some embodiments are part of a beamformer integrated circuit. The squint in this illustrative embodiment more particularly comprises an approximately +10° squint in an upward elevation direction, relative to antenna boresight 714. Other antenna elements of the first sub-array 704-1, such as antenna elements in a second column of antenna elements not explicitly shown, are assumed to be similarly controlled by similar controllable phase shifters in order to provide the desired type and amount of squint in the antenna beam 705-1.

In addition, the second sub-array of the split receive phased array antenna 704, also not explicitly shown in this figure, is assumed to be controlled to introduce a different type and amount of squint in its corresponding antenna beam, illustratively an approximately −10° squint in a downward elevation direction. Again, other types and directions of squint can be used for the sub-arrays of the split receive phased array antenna 704 in other embodiments.

As indicated previously, radar systems as disclosed herein can generate various types of outputs, including by way of example various types of range-velocity plots, in which range is on one axis and velocity on the other, with other indicators used to illustrate one or more detected targets and their associated AOAs. For example, such a plot may be presented on display 218 of receiver 200 in FIG. 2. A wide variety of additional or alternative outputs can be generated in a given radar system as disclosed herein.

Illustrative embodiments provide significant advantages over conventional radar systems and associated signal processing techniques.

For example, some embodiments provide a radar system with a split receive phased array antenna in which different portions of the split receive phased array antenna are processed in respective different receive signal paths.

These and other embodiments can achieve significantly better AOA resolution for a detected target in two orthogonal dimensions than would otherwise be possible using conventional approaches.

In some embodiments, improved AOA resolution can be provided utilizing only two receive signal paths, while also substantially reducing corresponding radar system cost, size and power consumption.

Illustrative embodiments of the disclosed arrangements can be deployed in a wide variety of different use cases without limitation. These use cases can include, by way of example, detecting and tracking objects, such as objects on the ground for vehicle navigation, objects in the air for airspace monitoring, etc. As more particular examples, radar systems as disclosed herein may be deployed as automotive radars configured to provide short-range object detection, collision avoidance and driver assistance, and/or as airspace radars configured to provide air traffic monitoring, support for military/defense applications, etc. Again, numerous other deployments of the disclosed radar systems are possible.

The above-noted features and advantages of illustrative embodiments may or may not be present in other embodiments.

One or more radar systems or associated information processing systems as disclosed herein can be implemented using one or more processing platforms each comprising at least one processing device, where a given such processing device may comprise a computer, server or other processing device, or combinations of multiple processing devices. Such computers, servers or other processing devices each illustratively comprise at least one processor coupled to a memory. For example, the radar system 100, and possibly also one or more external devices or systems in communication therewith, may be implemented utilizing one or more such processing platforms, each comprising one or more processing devices. Terms such as "processing platform" as used herein are intended to be broadly construed.

The above-noted processing platforms can each include multiple processing devices. Examples of such processing devices include computers or servers comprising respective processors and associated memory, or other types of processing devices. Storage devices such as storage arrays or cloud-based storage systems used for storing data herein are also considered "processing devices" as that term is broadly used herein.

The processing devices can be configured to communicate over one or more networks. The one or more networks can comprise, for example, a global computer network such as the Internet, a WAN, a LAN, a satellite network, a telephone or cable network, a cellular network such as a 4G or 5G network, a wireless network implemented using a wireless protocol such as Bluetooth, WiFi or WiMAX, or various portions or combinations of these and other types of communication networks.

A processing platform in some embodiments comprises at least one processor, at least one memory and at least one network interface. The processor is assumed to be operatively coupled to the memory and to the network interface. The term "processor" as used herein is therefore intended to be broadly construed.

The processor in some embodiments may comprise, for example, a microprocessor, an FPGA, a central processing unit (CPU), a graphics processing unit (GPU), an application-specific integrated circuit (ASIC), a system-on-chip (SOC), a neural processing unit (NPU), a data processing unit (DPU), a tensor processing unit (TPU), an arithmetic logic unit (ALU), a digital signal processor (DSP), and/or another processing device component, or combinations of multiple such components, as well as other types and arrangements of processing circuitry in any combination.

At least a portion of the functionality of a radar system as disclosed herein can be implemented using such circuitry.

In some embodiments, the processor comprises one or more graphics processor integrated circuits. Such graphics processor integrated circuits are illustratively implemented in the form of one or more GPUs. Accordingly, in some embodiments, radar system 100 is configured to include a GPU-based processing platform. Such a GPU-based processing platform can be at least partially cloud-based and is illustratively configured to implement one or more machine learning systems in conjunction with the timing synchronization functionality disclosed herein. Similar arrangements can be implemented using one or more CPUs, NPUs, DPUs, TPUs and/or other processing devices, in any combination.

A memory illustratively stores software program code for execution by a corresponding processor in implementing portions of the functionality of the processing platform. For example, at least portions of the functionality of a radar system as disclosed herein can be implemented using program code stored in one or more memories of one or more processing devices.

A given such memory that stores such program code for execution by a corresponding processor is an example of what is more generally referred to herein as a processor-readable storage medium having program code embodied therein, and may comprise, for example, electronic memory such as SRAM, DRAM or other types of random access memory, flash memory, read-only memory (ROM), magnetic memory, optical memory, or other types of storage devices in any combination.

Articles of manufacture comprising such processor-readable storage media are considered embodiments of the present disclosure. The term "article of manufacture" as used herein should be understood to exclude transitory, propagating signals.

Other types of computer program products comprising processor-readable storage media can be implemented in other embodiments.

In addition, illustrative embodiments may be implemented in the form of integrated circuits comprising processing circuitry configured to implement processing operations associated with a radar system as disclosed herein, as well as other related functionality. For example, at least a portion of the functionality of a given such radar system is illustratively implemented in at least one integrated circuit of a processing device of a processing platform.

The network interface is configured to allow the processing platform to communicate over one or more networks with other system elements, and may comprise one or more conventional transceivers.

It is to be appreciated that the particular arrangements of components and other system elements shown in FIGS. 1 through 7 are presented by way of illustrative example only, and numerous alternative embodiments are possible. For example, other embodiments of radar systems and associated information processing systems can be configured to implement signal processing functionality of the type disclosed herein.

Accordingly, although illustrative embodiments are described in the context of particular radar system configurations, it is to be appreciated that the disclosed techniques can be adapted in a straightforward manner to a wide variety of other radar system configurations.

Also, information processing systems with radar system functionality as disclosed herein can be configured to support a wide variety of distinct applications, in numerous diverse contexts. References herein to particular applications, such as multi-modal sensor systems with radars and implemented utilizing drones or other aerial or terrestrial vehicles, are therefore presented by way of illustrative example only, and the disclosed techniques can be adapted for use in any of a wide variety of other contexts.

The various embodiments disclosed herein should therefore not be construed as limiting in any way. Numerous alternative configurations of radar systems and associated signal processing operations can be utilized in other embodiments.

An information processing system incorporating or otherwise utilizing radar system functionality as disclosed herein may be implemented using one or more processing platforms, or portions thereof.

For example, one illustrative embodiment of a processing platform that may be used to implement at least a portion of an information processing system comprises cloud infrastructure including virtual machines implemented using a hypervisor that runs on physical infrastructure. Such virtual machines may comprise respective processing devices that communicate with one another over one or more networks.

The cloud infrastructure in such an embodiment may further comprise one or more sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the information processing system.

Another illustrative embodiment of a processing platform that may be used to implement at least a portion of an information processing system as disclosed herein comprises a plurality of processing devices which communicate with one another over at least one network. Each processing device of the processing platform is assumed to comprise a processor coupled to a memory.

Again, these particular processing platforms are presented by way of example only, and an information processing system may include additional or alternative processing platforms, as well as numerous distinct processing platforms in any combination, with each such platform comprising one or more computers, storage devices or other processing devices.

A given processing platform implementing at least a portion of a radar system and/or an associated information processing system as disclosed herein can run on or be otherwise supported by cloud infrastructure or other types of virtualization infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system. Such components can communicate with other elements of the information processing system over any type of network or other communication media.

As indicated previously, components of the system as disclosed herein can be implemented at least in part in the form of one or more software programs stored in memory and executed by a processor of a processing device. For example, certain functionality disclosed herein can be implemented at least in part in the form of software.

The particular configurations of information processing systems described herein are exemplary only, and a given such system in other embodiments may include other elements in addition to or in place of those specifically shown, including one or more elements of a type commonly found in a conventional implementation of such a system.

For example, in some embodiments, an information processing system may be configured to utilize the disclosed techniques to provide additional or alternative functionality in other contexts.

It should again be emphasized that the embodiments of the present disclosure as described herein are intended to be illustrative only. Other embodiments of the present disclosure can be implemented utilizing a wide variety of different types and arrangements of radar systems and associated information processing systems and/or other devices and systems, and corresponding signal processing operations, than those utilized in the particular illustrative embodiments described herein, and in numerous alternative radar system contexts. In addition, the particular assumptions made herein in the context of describing certain embodiments need not apply in other embodiments. These and numerous other alternative embodiments will be readily apparent to those skilled in the art.

What is claimed is:

1. A method comprising:

generating a transmit signal in a radar system;

transmitting the transmit signal via a transmit phased array antenna of the radar system;

receiving at least respective first and second receive signals via at least respective first and second sub-arrays of a receive phased array antenna of the radar system, wherein the first sub-array is electronically steered utilizing a first type of squinting and the second sub-array is electronically steered using a second type of squinting different than the first type of squinting;

processing the first and second receive signals through respective first and second receive signal paths to generate respective first and second digital receive signals;

computing respective first and second sets of range-Doppler information for the respective first and second digital receive signals;

determining range and velocity for a target based at least in part on a combination of at least portions of the first and second sets of range-Doppler information;

computing an azimuth angle for the target based at least in part on phase information of the respective first and second digital receive signals;

computing an elevation angle for the target based at least in part on magnitude information of the respective first and second digital receive signals; and outputting at least a subset of the range, velocity, azimuth angle and elevation angle for the target.

2. The method of claim 1 wherein the first type of squinting comprises a first amount of squinting in one of an upward elevation direction and a downward elevation direction and the second type of squinting comprises a second amount of squinting in the other of the upward elevation direction and the downward elevation direction.

3. The method of claim 2 wherein the first and second amounts of squinting are substantially equivalent to one another.

4. The method of claim 1 wherein the first and second sets of range-Doppler information comprise respective first and second range-Doppler maps.

5. The method of claim 1 wherein generating the transmit signal comprises generating the transmit signal from a corresponding digital transmit signal in a transmit signal path of the radar system, the transmit signal path comprising a serial arrangement of at least a transmit digital-to-analog converter (DAC), a transmit mixer, and a transmit beamformer coupled to the transmit phased array antenna.

6. The method of claim 1 wherein the first and second sub-arrays of the receive phased array antenna each comprise a same number and arrangement of antenna elements.

7. The method of claim 1 wherein the receive phased array antenna comprises a square array of antenna elements and the first and second sub-arrays of the receive phased array antenna comprise respective first and second halves of the square array of antenna elements.

8. The method of claim 7 wherein the receive phased array antenna comprises a four-by-four array of antenna elements and the first and second sub-arrays of the receive phased array antenna comprise respective two-by-four sub-arrays of the four-by-four array.

9. The method of claim 1 wherein the target is detected at least in part by:

summing the first and second sets of range-Doppler information; and identifying a signal of interest in the summed first and second sets of range-Doppler information utilizing a constant false alarm rate (CFAR) algorithm.

10. The method of claim 1 wherein each of the first and second receive signal paths comprises a serial arrangement of at least a receive beamformer coupled to a corresponding one of the sub-arrays of the receive phased array antenna, a receive mixer and a receive analog-to-digital converter (ADC).

11. The method of claim 1 wherein processing the first and second receive signals through respective first and second receive signal paths to generate respective first and second digital receive signals comprises demodulating the first and second receive signals in the respective first and second receive signal paths.

12. The method of claim 1 wherein computing an azimuth angle for the target based at least in part on phase information of the respective first and second digital receive signals comprises computing the azimuth angle based at least in part on a phase difference between the first and second digital receive signals.

13. The method of claim 1 wherein computing an elevation angle for the target based at least in part on magnitude information of the respective first and second digital receive signals comprises computing the elevation angle based at least in part on an amplitude difference between the first and second digital receive signals.

14. The method of claim 1 further comprising performing one or more calibration operations relating to at least one of the first and second digital receive signals.

15. The method of claim 14 wherein the one or more calibration operations comprise applying one or more calibration corrections digitally to at least one of the first and second digital receive signals before computing the first and second sets of range-Doppler information for the respective first and second digital receive signals.

16. The method of claim 14 wherein the one or more calibration operations comprise generating one or more calibration coefficients at least in part as a function of a beam pointing angle.

17. The method of claim 14 wherein the one or more calibration operations comprise equalizing or otherwise normalizing at least respective portions of the first receive signal path and the second receive signal path.

18. The method of claim 17 wherein equalizing or otherwise normalizing at least respective portions of the first and second receive signal paths comprises performing complex normalization to normalize gain and phase of the first and second receive signal paths.

19. A radar system comprising:

a transmit phased array antenna configured to transmit a transmit signal generated in a transmit signal path of the radar system;

a receive phased array antenna configured to receive at least respective first and second receive signals via at least respective first and second sub-arrays of the receive phased array antenna;

first and second receive signal paths configured to process the respective first and second receive signals to generate respective first and second digital receive signals; and at least one processing device coupled to the transmit signal path and the first and second receive signal paths, the at least one processing device being configured:

to electronically steer the first sub-array of the receive phased array antenna utilizing a first type of squinting;

to electronically steer the second sub-array of the receive phased array antenna using a second type of squinting different than the first type of squinting;

to compute respective first and second sets of range-Doppler information for the respective first and second digital receive signals;

to determine range and velocity for a target based at least in part on a combination of at least portions of the first and second sets of range-Doppler information;

to compute an azimuth angle for the target based at least in part on phase information of the respective first and second digital receive signals;

to compute an elevation angle for the target based at least in part on magnitude information of the respective first and second digital receive signals; and to output at least a subset of the range, velocity, azimuth angle and elevation angle for the target.

20. A computer program product comprising a non-transitory processor-readable storage medium having stored therein program code of one or more software programs of a radar system, the radar system comprising a transmit phased array antenna configured to transmit a transmit signal, a receive phased array antenna configured to receive at least respective first and second receive signals via at least respective first and second sub-arrays of the receive phased array antenna, and first and second receive signal paths configured to process the respective first and second receive signals to generate respective first and second digital receive signals, wherein the program code, when executed by at least one processing device of the radar system, causes the radar system:

to electronically steer the first sub-array of the receive phased array antenna utilizing a first type of squinting;

to electronically steer the second sub-array of the receive phased array antenna using a second type of squinting different than the first type of squinting;

to compute respective first and second sets of range-Doppler information for the respective first and second digital receive signals;

to determine range and velocity for a target based at least in part on a combination of at least portions of the first and second sets of range-Doppler information;

to compute an azimuth angle for the target based at least in part on phase information of the respective first and second digital receive signals;

to compute an elevation angle for the target based at least in part on magnitude information of the respective first and second digital receive signals; and to output at least a subset of the range, velocity, azimuth angle and elevation angle for the target.

* * * * *